Aug. 20, 1935.  A. KALIN  2,011,859

SPEED GOVERNOR DRIVE

Filed May 28, 1932  2 Sheets-Sheet 1

Inventor
Albert Kalin
By Wilson, Dowell,
McCanna & Rehm
Attys

Aug. 20, 1935.  A. KALIN  2,011,859
SPEED GOVERNOR DRIVE
Filed May 28, 1932  2 Sheets-Sheet 2

Inventor.
Albert Kalin
By Wilson, Dowell,
McCanna & Rehm
Attys.

Patented Aug. 20, 1935

2,011,859

UNITED STATES PATENT OFFICE 2,011,859

SPEED GOVERNOR DRIVE

Albert Kalin, Rockford, Ill., assignor to Woodward Governor Company, Rockford, Ill., a corporation of Illinois Application May 28, 1932, Serial No. 614,088

8 Claims. (Cl. 290—40)

This invention relates to a new and improved electrical drive for the speed governor of a prime mover in a power station.

The most important requirement of a speed governor is necessarily that the speed thereof shall at all times be a linear function of the instantaneous speed of the governed machine. Heretofore the governor was driven mechanically by mounting flyballs directly on the prime mover shaft, or by belt connection with said shaft, or a gear connection therewith. The inherent weaknesses of the mechanical drives led to the electrical drives consisting first in the use of an electric motor supplied with A. C. current by connection with leads of the main power generator, and later by the use of an electric motor supplied with A. C. current from slip rings on the pilot exciter. The latter electrical drive, while a decided improvement over the other electrical drive, is still subject to troubles arising from disturbances in the electrical system which affect the operation of the speed governor. For example, with the pilot exciter there was the disturbing action of the voltage regulator, which caused momentary distortion in the alternating current and threw the governor drive motor out of synchronism with the prime mover. Furthermore, with those electrical drives an appreciable time was required for the exciter voltage to build up, so that the governor motor had to wait for the voltage to be built up before it rotated, came up to speed, and assumed control. It is, therefore, the principal object of my invention to provide a governor drive which is absolutely distinct and separate from all electrical circuits in the power plant so as not to be affected by any disturbance in the transmission system of the plant, and which embodies a generator of such construction that it instantly responds to the turning of the prime mover, so that the governor is up to speed the instant the prime mover is up to speed, and in shutting down, the governor motor and prime mover stop at the same instant.

More specifically stated, my invention contemplates the use of a permanent magnet generator either directly connected to or driven synchronously with the prime mover shaft to supply the speed governor with current to drive the same at all times at a speed exactly proportional to the speed of the prime mover. By making this generator of a form in which the stator is the only electrical winding, the field excitation being supplied by a permanent magnet rotor, the motor for the speed governor is supplied with current through a simple wire connection, without collector rings and brushes or any sliding contacts.

The invention is illustrated in the accompanying drawings, in which—

The same reference numerals are applied to corresponding parts throughout the views.

Figure 1:
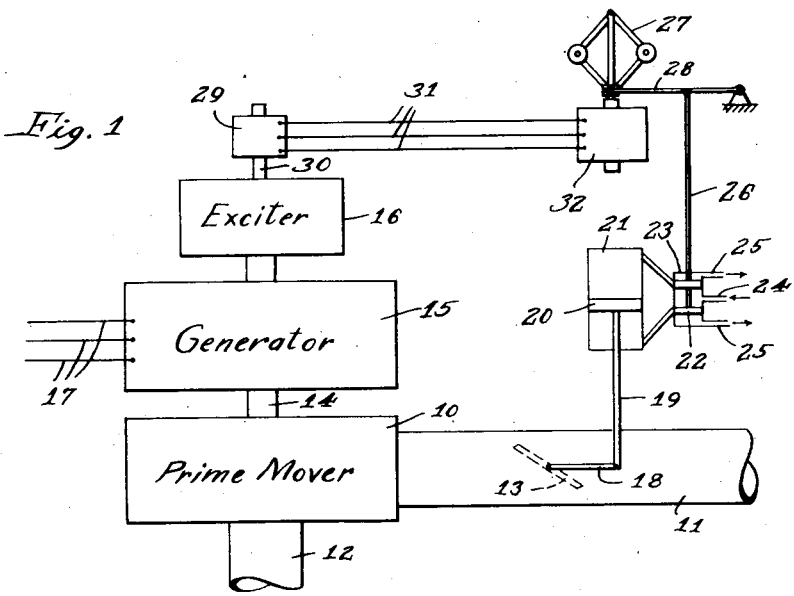
Figure 1 is a more or less diagrammatic view showing the application of my invention to a hydro-electric power plant installation.

Referring to Figure 1, there is shown diagrammatically enough of a hydro-electric power plant installation to properly illustrate my improved speed governor drive. It should, however, be understood at the outset that the invention is applicable to any type of hydro-electric or other plant. The term "prime mover" is, therefore, to be taken in its broadest sense, and the claims should be construed accordingly.

The prime mover, indicated generally by the reference numeral 10, is a turbine having a penstock 11 and draft tube 12 for the inlet and outlet of water. 13 is a pilot valve or gate controlling the inlet of water which, as will presently appear, is regulated according to the load to maintain a substantially constant speed for the prime mover. The shaft 14 of the prime mover has the rotor of the generator 15 mounted directly thereon. 16 is an exciter which also has its armature mounted on the shaft 14, this being a direct current generator for exciting the generator 15. At 17 are indicated the line conductors of a 3-phase system, connected with the generator 15. In the operation of such a power plant, the fluctuations in load require an increase or decrease in water supply to the turbine 10. This variation in the water supply is obtained by opening or closing the gate 13 with a view to maintaining a substantially constant speed for the shaft 14. The gate 13, as will soon appear, is controlled by a speed governor, the driving motor of which derives its power supply from a permanent magnet generator driven by or in synchronism with the shaft 14, so that any tendency for slowing down of the shaft 14 is counteracted by increasing the flow of water through the penstock 11 to the turbine, and vice versa.

Various forms of means may be provided for operating the gate 13. I have shown a fluid pressure type means where the governor is arranged simply to control a pilot valve, and this in turn controls the operation of the hydraulic piston to operate the gate. Thus, the gate is illustrated as having a lever 18 for operating the same connected through a rod 19 with a piston 20 in a hydraulic cylinder 21. A pilot valve 22 operating in a valve chamber 23 controls the admission of the pressure fluid to either end of the cylinder 21 and the exhausting of the fluid from the other end in a well known manner, the pipe shown at 24 having connection with an oil pump and associated pressure and storage tanks for the delivery of the pressure fluid, and the pipes 25 being return pipes for the exhausting of the fluid from either end of the cylinder. A rod 26 is shown for operating the pilot valve suitably connected with a flyball governor 27 through the intermediary of a rocker beam 28. Leaving out of consideration for the time being the means for driving the governor 27, it will be evident that if the governor speeds up, the pilot valve 22 is raised to admit pressure fluid to the upper end of the cylinder 21 so as to cut down the flow of water through the penstock 11, and vice versa. Such indirect control of the speed of a prime mover by a governor is well known in this art, and no invention is claimed therein, excepting only in so far as the same cooperates in the general combination.

As stated before, it is of prime importance to have the speed of the governor exactly proportional to the speed of the prime mover. The drive for the governor provided in accordance with my invention positively insures such a speed relationship. It is important to bear in mind at the outset that much of the trouble with previous electrical drives for speed governors has been due to the source of electric power for the speed governor being in some way affected by disturbances of an electrical nature occurring elsewhere in the electrical system of the power plant. In accordance with my invention, the electrical drive for the speed governor is completely divorced from any electrical connection with the rest of the electrical system of the power plant. It consists in the provision of a permanent magnet generator 29 driven by the shaft connection 30 in synchronism with the turbine 10 and generator 15, that is to say, having nothing more than an ordinary mechanical connection with the prime mover to turn at the same speed, or if desired, at a speed exactly proportional to the speed thereof. In most cases it is preferred to have the permanent magnet generator directly connected to the shaft of the machine being governed, as shown. The permanent magnet generator has, as will soon appear, only one electrical winding, the stator winding; the field excitation is supplied by a permanent magnet rotating field. The winding is connected directly as indicated at 31 to the stator winding of the speed governor drive motor 32. The governor 27 turns with the rotor of the motor 32. Thus, the speed governor is driven at all times at a speed exactly proportional to the speed of the shaft 14 by what may be termed a combination mechanical and electrical drive, this being made possible by the use of a permanent magnet generator.

In operation, the motor 32 is a squirrel cage induction motor or any suitable synchronous motor that will operate at a speed which is a linear function of the frequency. The motor will accordingly operate at a speed exactly proportionate to that of the shaft 14, due to the fact that the permanent magnet generator 29 is a source of polyphase A. C. voltage in exact synchronism with the revolution of the machine to which it is coupled. The correct speed of the motor 32 is also due to the fact that the permanent magnet generator is a source of speed governor power supply which is absolutely distinct and separate from all electrical circuits in the power plant and is, therefore, not in any way affected by any disturbance in the transmission system of the plant. The permanent magnet rotating field obviates the necessity of providing any direct current excitation from another source and permits the generator 29 to be completely cut off from any electrical connection with the rest of the electrical system of the plant. The governor 27 will accordingly speed up in proportion to any speeding up of the prime mover, and vice versa. The governor through its indirect control of the gate 13 serves to maintain the speed of the prime mover substantially constant. In passing, I might also enumerate the following additional advantages in the present speed governor drive:

First, the elimination of collector rings and brushes and all sliding contacts, which means that the only wear will come on the long life anti-friction bearings of the rotor of the generator 29, so that there is practically no maintenance to speak of;

Second, the special permanent magnet generator is supplied as a separate unit and part of the speed governing equipment and can be installed without making provision for any electrical connection or cooperation whatsoever with the generator of the power plant, which, of course, simplifies matters;

Third, the permanent magnet generator affords the advantages of a perfect mechanical governor drive without the attendant weaknesses of belt or gear drives;

Fourth, any desired speed ratio is obtainable between the prime mover and the speed governor by the proper relationship in the number of poles of the permanent magnet generator and the number of poles in the speed governor motor;

Fifth, the present drive is applicable to any existing power plant installation without changing the governor drive motor;

Sixth, the permanent magnet generator is something practically indestructible, because if for any reason, such as short circuiting or accidentally becoming connected to any other electrical circuits, the permanent magnet generator, or magneto generator as it may be called, becomes partially demagnetized, it may be easily re-magnetized in the field by the same method by which its original magnetization is secured, thus avoiding any necessity for dismantling and putting a power plant unit out of commission for any objectionable period of time;

Seventh, standard type governor drive motors are used and are caused to start when the prime mover starts and to rotate at proportional speeds over the complete range of operation by virtue of the permanent magnet generator driven with the prime mover and supplying the current for the governor drive motor, and Eighth, when a speed governor drive motor is supplied with alternating current potential from the leads of the main generator, serious difficulty is encountered when the main generator for any reason drops out of step with the rest of the power system, for, under such a condition, the speed governor drive motor responds only to the frequency of the power system and results in the prime mover operating without any control of its own speed whatever. The permanent magnet generator, being driven in timed relationship to its prime mover, causes the speed governor at all times to function in response to the individual prime mover speed and therefore assures more positive speed control.

Figure 2:
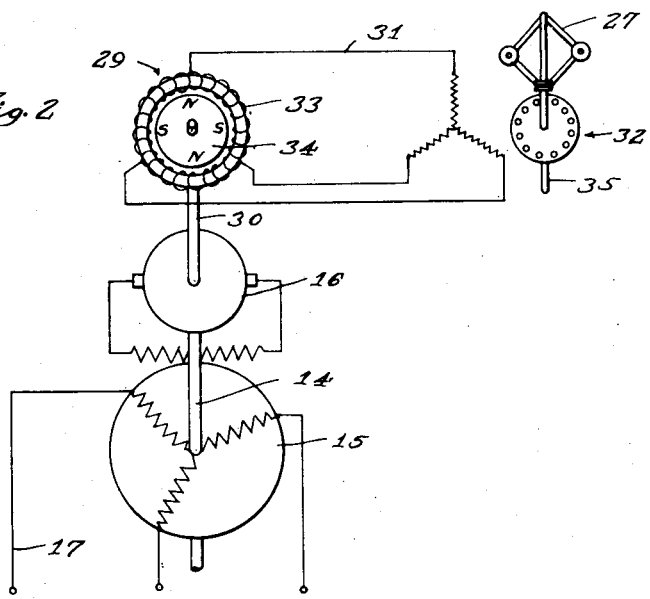
Fig. 2 is an electrical wiring diagram corresponding to Figure 1.
Figure 3:
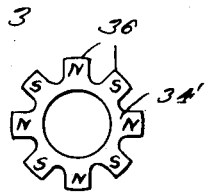
Figs. 3 and 4 show two forms of magnetic rotors either of which could be used in the permanent magnet generator indicated in Fig. 2.
Figure 4:
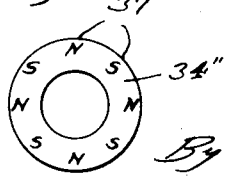
Figure 5:
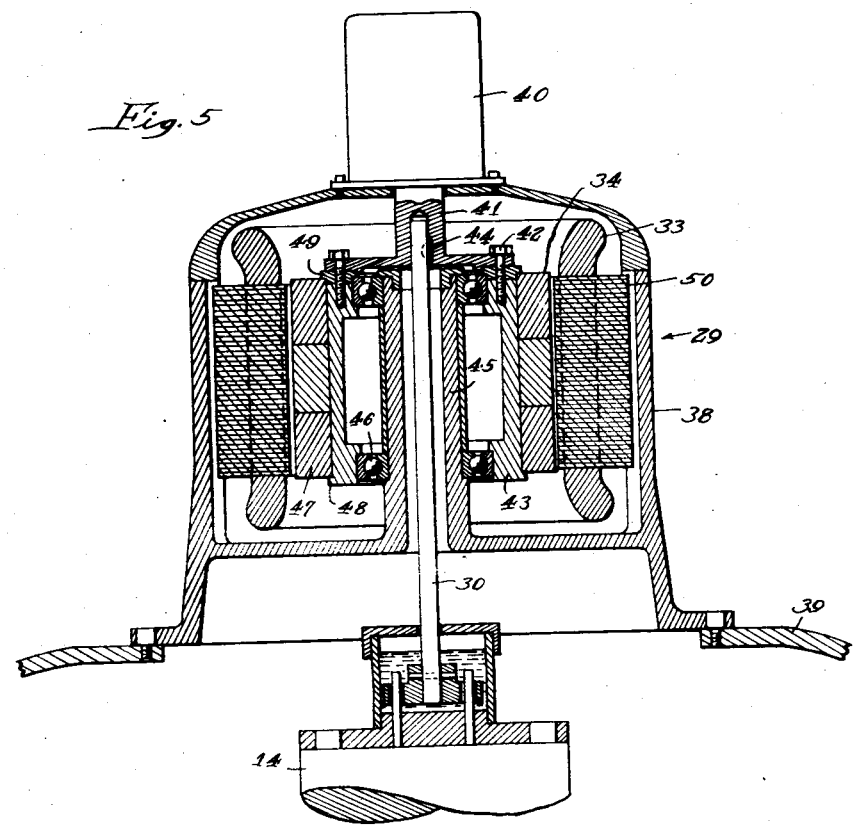
Fig. 5 is a vertical cross-section through the permanent magnet generator.
Figure 6:
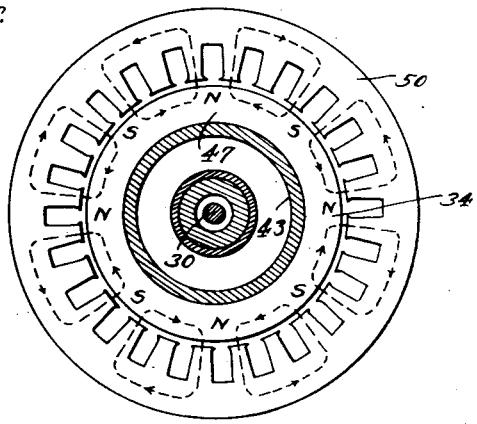
Fig. 6 is a horizontal section through the rotor and stator thereof.

The construction of the permanent magnet generator 29 is diagrammatically shown in Fig. 2, in which 33 designates the only electrical winding employed, namely, the stator or armature winding, and in which 34 designates the permanent magnet rotor which supplies the field excitation. It will be observed that the leads 31 are tapped into the winding 33 and are connected with the field of the motor 32 which, as indicated, has the governor 27 mounted on the armature shaft 35 thereof. Now, so far as the speed governor drive is concerned, the precise construction of the permanent magnet generator 29 is more or less immaterial. That is to say, the permanent magnet rotor thereof may be of the form shown at 34' in Fig. 3 with physical poles 36, or of the simple ring form shown at 34'' in Fig. 4 without physical poles, there being magnetized pole areas 37 in the circular periphery of the ring instead of projecting physical poles. It is manifest that any desired speed ratio is possible between the prime mover and the speed governor motor by simply providing the proper combination of the number of poles in the permanent magnet rotor relative to the poles of the speed governor motor. I shall now proceed to a more detailed description of the permanent magnet generator by reference to Figs. 5 and 6, and in so doing, want it understood that while the same was especially designed for a speed governor drive, it is capable of use for numerous other applications wherever a permanent magnet polyphase generator is desired. The permanent magnet generator forms the subject matter of a divisional application, Serial No. 667,370, filed April 22, 1933.

The housing 38 for the generator 29 is shown as supported on top of the housing 39 of the exciter 16. This makes for compactness and neater appearance, and facilitates providing a driving connection, such as that indicated at 30, between the rotor 34 of the generator and the shaft 14 of the prime mover, which, it may be assumed, extends in one continuous length through the generator 15 and exciter 16. The housing 38 also forms a support for the housing 40 of a speed limit switch, the rotary element of which is driven by the shaft 41 forming a continuation of the shaft 30. The shaft 41 is fastened as at 42 to the nonmagnetic spider 43 forming part of the rotor 34 and a key 44 provides a detachable driving connection between the shafts 30 and 41. An arbor 45 is suitably formed integral with the housing 38 and serves as a support on which the rotor 34 is arranged to revolve, anti-friction bearings 46 being provided to make for easy running. The rotor 34 is made up of a number of magnet steel rings 47 fitting over the spider 43 in abutment with the annular rim 48 at the lower end thereof and clamped by means of a ring 49 fastened in place by the bolts 42. These rings are permanently magnetized in a manner which will soon be described, to provide any predetermined number of poles in, as distinguished from projecting from, the periphery of the rings. That is to say, the poles are evident as magnetized areas on the circular periphery of the rings 47, as indicated in dotted lines in Fig. 6. Eight poles happen to be illustrated, although, of course, the number might be two, four, six or any even number of poles, depending on the number of poles of the polyphase stator winding 33, and also depending upon the use to which the generator is to be put, it being the chief advantage of the simple ring rotor construction that the same ring may be magnetized for whatever number of poles is desired. Considering that one dimension of ring may be used for a whole range of magneto generators, irrespective of the number of poles required, it is obvious how this reduces the number of parts necessary to cover a wide range of designs. The required magneto generator output at reduced generator speeds is obtained by stacking two, three or more magnetic steel rings and providing a corresponding stacking of stator laminations. The stator is made up of laminae 50 suitably mounted in the housing 38 and having the winding 33 previously mentioned inserted between the radial teeth formed on the inner periphery of the stator. The winding 33 is, of course, the one to which the wires 31 are connected, as previously described, and since field excitation is supplied by the permanent magnet rotor, the generator serves as a source of polyphase A. C. voltage, the current generated being conducted through the wires 31 from the winding 33 in the turning of the rotor, without the necessity for any collector rings and brushes.

The rotor 34 may be magnetized in any suitable or preferred manner. For example, it may be magnetized apart from the stator by means of direct current impressed on a copper magnetizing winding, and removing the winding after magnetizing, which leaves the rotor with poles permanently magnetized in the periphery thereof. However, I prefer to accomplish the magnetization by having the rotor in place in the generator and simply momentarily connecting the generator at a standstill to a polyphase power supply of from ten to twenty times the normal generator voltage and disconnecting the generator as soon as it has motored up to synchronous speed. This is by far the most effective method of magnetization and much superior to any direct current method. I have found that a simple ring type rotor without physical poles but having permanent magnet fields of the kind mentioned will give equal performance to that of any rotor with regular physical poles. The fact that the rotor is magnetized by impressing sine wave polyphase alternating current on the stator winding and allowing the rotor to come up to synchronous speed, as a hysteresis-induction motor, results in flux distribution in the air gap of such description that a very close approach to a sine wave voltage is obtained from the machine when operating as a generator, even though the number of coils per phase per pole is small.

It is believed the foregoing description conveys a good understanding of all of the objects and advantages of my invention. The appended claims have been drawn so as to cover all legitimate modifications and adaptations.

I claim:

1. The combination with a prime mover and its load, a speed governor for controlling the operation of the prime mover and an A. C. motor for driving the governor, of a permanent magnet generator comprising a wound stator and a permanent magnet rotor driven relative thereto in timed relation with the prime mover whereby to generate in the stator winding alternating current of a frequency bearing a predetermined relation to the speed of the prime mover, the stator winding having direct brushless connections with the aforesaid governor drive motor to operate the same.

2. The combination with a prime mover, a main generator driven thereby, an exciter for the generator, a speed governor for controlling the operation of the prime mover and an A. C. motor for driving the governor, of a permanent magnet generator comprising a wound stator, and a permanent magnet rotor driven relative thereto in timed relation with the prime mover whereby to generate in the stator winding alternating current of a frequency bearing a predetermined relation to the speed of the prime mover, said permanent magnet generator not requiring electrical connection with the main generator and exciter, the stator winding of said permanent magnet generator having direct electrical connection with the aforesaid governor drive motor to operate the same.

3. The combination with a prime mover and its load, a speed governor for controlling the operation of the prime mover and an A. C. motor for driving the governor, of a permanent magnet generator comprising stator and rotor elements, one of said elements being wound and the other of said elements being a permanent magnet, the one element being driven relative to the other in timed relation with the prime mover to generate in the wound element alternating current of a frequency bearing a predetermined relation to the speed of the prime mover, the wound element not requiring electrical connection with any circuit foreign to the governor drive circuit, and having electrical connection with the aforesaid governor drive motor to operate the same.

4. The combination with a prime mover, a main generator driven thereby having exciting means therefor, there being circuits including the generator and exciting means, a speed governor for controlling the operation of the prime mover and an A. C. motor for driving the governor, of a permanent magnet generator comprising a wound stator and a permanent magnet rotor driven relative thereto in timed relation with the prime mover whereby to generate in the stator winding alternating current of a frequency bearing a predetermined relation to the speed of the prime mover, the stator winding not requiring electrical connection to the above or other circuits foreign to the governor drive circuit, said stator winding having direct electrical connections with the aforesaid governor drive motor to operate the same.

5. The combination with a prime mover and its load, a speed governor for controlling the operation of the prime mover and an A. C. motor for driving the governor, of a permanent magnet generator comprising a wound stator and a permanent magnet rotor driven relative thereto in timed relation with the prime mover to generate in the stator winding alternating current of a frequency bearing a predetermined relation to the speed of the prime mover, the stator winding being devoid of any electrical connections save a direct brushless electrical connection with the aforesaid motor.

6. The combination with a prime mover and a main generator driven thereby on a common shaft, a speed governor for controlling the operation of the prime mover and an A. C. motor for driving the governor, of a permanent magnet generator comprising a wound stator and a permanent magnet rotor, the stator winding being independent of any electrical connection with the aforesaid main generator and having direct brushless connections with the aforesaid motor, and the permanent magnet rotor being driven by the aforesaid shaft whereby to generate in the stator winding alternating current of a frequency bearing a predetermined relation to the speed of the prime mover.

7. The combination with a speed governor for controlling the operation of a prime mover, and an A. C. motor for driving the governor, of a permanent magnet generator comprising a wound stator having direct brushless connections with the aforesaid motor, and a permanent magnet rotor arranged to be driven relative to the stator in timed relation with the prime mover whereby to generate in the stator winding alternating current of a frequency bearing a predetermined relation to the speed of the prime mover.

8. The combination with a speed governor for controlling the operation of a prime mover and an A. C. motor for driving the governor, of a permanent magnet generator comprising rotor and stator elements, one of said elements being wound and the other being a permanent magnet, the wound element being electrically connected with the aforesaid motor, and one of said elements being arranged to be driven in timed relation with the prime mover whereby to generate in the wound element alternating current of a frequency bearing a predetermined relation to the speed of the prime mover.

ALBERT KALIN.